J. MORTON.

Water-Tanks for Railways.

No. 5,545. Reissued August 19, 1873.

Witnesses:
T. C. Brecht.
John R. Young

Inventor:
John Morton, by
Prindle and Co. his Attys

AM. PHOTO-LITHOGRAPHIC CO. N.Y. (OSBORNE'S PROCESS)

UNITED STATES PATENT OFFICE.

JOHN MORTON, OF CINCINNATI, OHIO, ASSIGNOR, BY MESNE ASSIGNMENTS, TO THE McGOWAN PUMP COMPANY.

IMPROVEMENT IN WATER-TANKS FOR RAILWAYS.

Specification forming part of Letters Patent No. 63,418, dated April 2, 1867; reissue No. 4,543, dated September 5, 1871; reissue No. 5,545, dated August 19, 1873; application filed March 8, 1873.

CASE C.

*To all whom it may concern:*

Be it known that I, JOHN MORTON, now of Cincinnati, in the county of Hamilton and State of Ohio, did invent certain new and useful Improvements in Water-Tanks for Railways, for which Letters Patent No. 63,418 were issued to me upon the 2d day of April, 1867, which Letters Patent were duly surrendered, and thereafter duly reissued, as provided by law, bearing date of the 5th day of September, 1871, and No. 4,543, which reissued Letters Patent have been found defective in that the specification and claims do not cover and embrace all of the original invention and improvements as contained in the model and drawings filed in the United States Patent Office on the 1st day of February, 1867. Now, therefore, being desirous to reissue the said Letters Patent in the manner and form prescribed by law, I have prepared, and do hereby declare that the following is a full, clear, and exact description of the said improvements, reference being had to the accompanying drawing making a part of this specification, in which—

Figure 1:
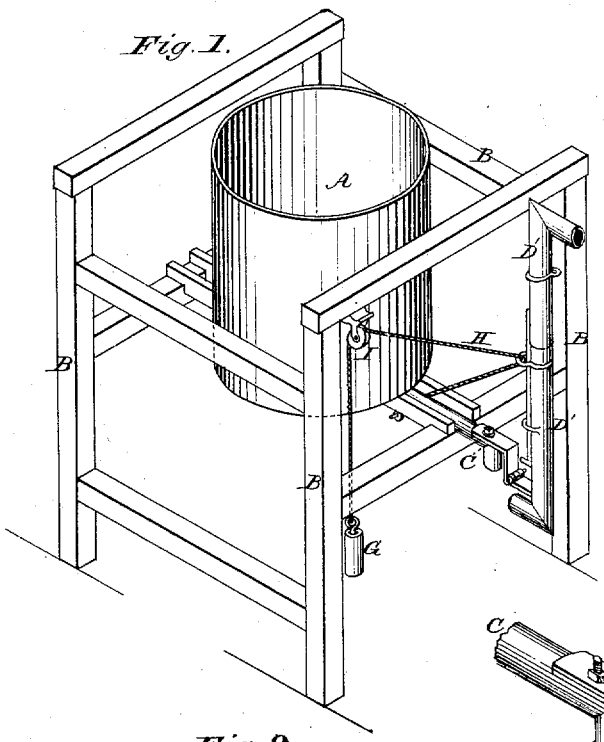
Figure 2:
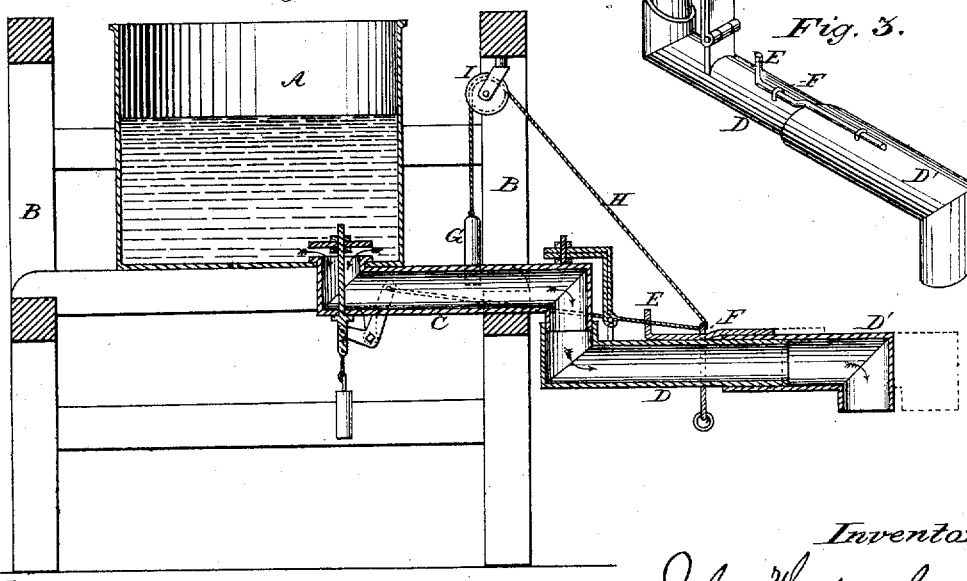
Figure 3:
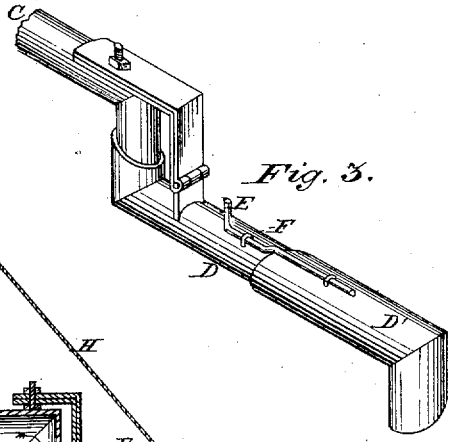

Figure 1 is a perspective view of a water-tank containing my improvement. Fig. 2 is an enlarged vertical central section of the same upon a line extending from front to rear, and Fig. 3 is a perspective view of the delivery-tube.

Letters of like name and kind refer to like parts in each of the figures.

In the use of the delivery-pipes of water-tanks it is found necessary that they should be capable of longitudinal adjustment, in order that their discharge-openings may be caused to coincide with the man-hole of the locomotive-tender. To effect this object, and to cause the pipe to automatically return to its normal position when released, is the design of my invention; which consists in a delivery-pipe made longitudinally extensible, substantially as and for the purpose hereinafter specified.

In the annexed drawing, A represents a water-tank supported upon, or by means of, a suitable frame, B, and provided with a supply-pipe, C, which extends downward through the bottom of said tank, and thence horizontally outward to the front. To the front end of the supply-pipe C is hinged or otherwise connected the inner end of a delivery-pipe, D, in such a manner as to permit its outer end to be turned upward and rearward until said pipe occupies a vertical position, as seen in Fig. 1. The delivery-pipe D is constructed in two sections, the outer one of which, D′, is made slightly larger than the inner section D, and slides inward over the forward end of the same, and may be moved longitudinally thereon. In order to limit the longitudinal movement of the section D′, a rod, E, is secured to or upon the upper side of the same, and, extending rearward through an eye, F, attached to the inner section, has its end bent upward. By this arrangement the accidental displacement of said outer section, by its being drawn off from the inner section, is effectually prevented. The delivery-pipe is returned to a vertical position, when not in use, by means of a weight, G, which is attached to one end of a cord, H, that passes upward around a pulley, I, that is swiveled within the frame B, and thence downward to said pipe, to which it is attached.

By giving to the weight a sufficient size the weight of the pipe may be overbalanced, so as to return the latter to a vertical position whenever released; but I prefer to have said weight of such size as to cause said pipe to occupy a horizontal position, unless a slight upward impulse is given by the hand.

Having thus fully set forth the nature and merits of my invention, what I claim as new is—

In a water-tank, a delivery-pipe made longitudinally extensible, substantially as and for the purpose specified.

In testimony whereof I hereunto set my hand this 28th day of February, 1873.

JOHN MORTON.

Witnesses:

R. SIMPSON,

I. W. BREWSTER.